(12) United States Patent
Kalogeraki et al.

(10) Patent No.: US 7,743,044 B1
(45) Date of Patent: Jun. 22, 2010

(54) DISTRIBUTED INFORMATION RETRIEVAL IN PEER-TO-PEER NETWORKS

(75) Inventors: Vana Kalogeraki, Sunnyvale, CA (US); Dimitrios Gunopulos, Riverside, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2113 days.

(21) Appl. No.: 10/156,417

(22) Filed: May 28, 2002

(51) Int. Cl.
*G06F 17/30* (2006.01)

(52) U.S. Cl. .................. 707/706; 707/723; 707/748; 707/749

(58) Field of Classification Search ............ 707/3, 707/4, 10
See application file for complete search history.

(56) References Cited

U.S. PATENT DOCUMENTS

| | | | | |
|---|---|---|---|---|
| 5,151,978 A | * | 9/1992 | Bronikowski et al. | 709/216 |
| 5,278,823 A | * | 1/1994 | Handel | 370/249 |
| 6,026,394 A | * | 2/2000 | Tsuchida et al. | 707/3 |
| 6,192,364 B1 | * | 2/2001 | Baclawski | 707/10 |
| 6,256,621 B1 | * | 7/2001 | Tsuchida et al. | 707/2 |
| 6,484,143 B1 | * | 11/2002 | Swildens et al. | 705/1 |
| 6,701,374 B2 | * | 3/2004 | Gupta et al. | 709/238 |
| 6,778,987 B1 | * | 8/2004 | Wynblatt et al. | 707/10 |
| 6,950,821 B2 | * | 9/2005 | Faybishenko et al. | 707/10 |
| 6,954,456 B2 | * | 10/2005 | Cranor et al. | 709/203 |
| 2002/0091763 A1 | * | 7/2002 | Shah et al. | 709/203 |
| 2002/0156613 A1 | * | 10/2002 | Geng et al. | 703/23 |
| 2003/0191828 A1 | * | 10/2003 | Ramanathan et al. | 709/221 |
| 2003/0208621 A1 | * | 11/2003 | Bowman | 709/242 |

\* cited by examiner

*Primary Examiner*—Baoquoc N To

(57) ABSTRACT

A mechanism for information retrieval in fully decentralized, distributed, peer-to-peer network systems. Peer profiles are aggregated and collected in real-time by each peer. Each peer uses and integrates knowledge that it collects during query-reply cycles for each future query received, thereby learning over time and making information retrieval a more intelligent and rapid process. Each peer then autonomously decides which of its peers are most likely to have an answer to a given query. A routine is provided for monitoring the messages and profiling each peer, building a local peer profile for each node exchanging messages in the peer-to-peer network based on messages passing through the node.

21 Claims, 3 Drawing Sheets

DISTRIBUTED INFORMATION RETRIEVAL IN PEER-TO-PEER NETWORKS

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO AN APPENDIX

Not Applicable.

BACKGROUND

1. Field Technology

The present invention relates generally to computer networking, and particularly to peer-to-peer networks.

2. Description of Related Art

The increasing need to share computer resources and information, the decreasing cost of powerful workstations, the widespread use of networks, and the maturity of software technologies have increased the demand for more efficient information retrieval mechanisms.

"Peer-to-Peer" (P2P) network systems are real-time communications networks where any computing device currently connected—also sometimes referred to as an "edge node" or "fringe node"—can take the role of both a client and a server, where "Client-Server" is a model of interaction in a distributed computer network system in which a program at one site sends a request to another site and then waits for a response. The requesting program is called the "client," and the program which responds to the request is called the "server." In the context of the Internet, also referred to as the World Wide Web ("www" or just "web"), the client is a "browser," a program which runs on a computer of an end-user. A program and network computer which responds to a browser request by serving web pages and the like, is referred to as a "server."

Generally, peer-to-peer systems are connected personal computing devices—e.g., personal computer ("PC"), personal digital assistant ("PDA"), and the like—where the operating platforms may be heterogeneous. Each node connects to the network of peers by establishing a relationship with at least one peer currently on the network in a known manner referred to as the exchange of "ping" and "pong" messages. Peers arrive and disappear dynamically, shaping the peer-to-peer network's real-time structure; this contrasts to the Internet where web sites are statically allocated. Peer-to-peer is a way of decentralizing not just features, but costs and administration as well, eliminating the need for a single, centralized component, such as a known manner index server. Peer-to-peer permits ad-hoc collaboration and information sharing in what are large-scale, dynamic, distributed environments. Peer-to-peer systems are becoming increasingly popular because they offer the significant advantages of simplicity, ease of use, scalability, and robustness.

Peer-to-peer computer applications are a class of applications that takes advantage of resources available on this fringe of the standard Internet; for example, decentralized resources of storage, central processing unit (CPU) cycles, content, human presence, and the like. However, accessing such decentralized resources means operating in an environment of unstable connectivity and unpredictable locations since the nodes operate outside the DNS, having significant or total autonomy from known manner dedicated central servers. At the same time, an advantage of such systems is that communications can be established while tolerating and working with the variable connectivity of hundreds of millions of such nodes. Peer-to-peer system designers must try to solve such connectivity problems. A true peer-to-peer system must (1) treat variable connectivity and temporary network addresses as the norm, and (2) give the fringe nodes involved in the network at least significant autonomy.

One specific problem is that existing search mechanisms in peer-to-peer networks are inefficient due to the decentralized nature just described. That is, the topology of the peer-to-peer network is dynamically evolving in real time and arbitrary at any point in time with various connectivity degrees between the linked peers, making search and retrieval of the desired information a difficult problem. Moreover, the only thing assumptively known about a peer's knowledge base is what the peer wants to, or has time to, make available. This is all somewhat contrary to the objective of helping a querying peer efficiently find the most relevant answer.

One known peer-to-peer network communication protocol, known as "Gnutella™," is a file sharing technology, offering an alternative to web search engines used in the Internet, with a fully distributed mini-search engine and a file serving system for media and archive files, that operates on an open-source policy of file sharing. FIG. 1 (Prior Art) illustrates a simple peer-to-peer structure and searching in a Gnutella peer-to-peer network model. In essence, each node (each circle symbol) represents a computing device; an accurate model may have tens of thousands of such nodes at any given point in time, with nodes appearing and disappearing with various links substantially randomly, where dotted-lines represent currently active network links between nodes. Individual host nodes 101, 102, 103, and the like, store resources, e.g., a database of documents or other content. Moreover, each peer uses its own local directory structure to store its copy of each of the resources. Any peer can propagate a search request, or "query," illustrated in FIG. 1 by arrows parallel to current links, as broadcast by a first "Querying Peer" 101 to all of its "Neighbor Peer(s)" 102. Note that a neighbor peer becomes the querying peer when it passes a search request on to its neighbors which is not in direct communication with the first Querying Peer 101, e.g., a neighbor forwarding the query to node 103. In other words, each peer not only searches its own directory for the resource-of-interest of the query, but broadcasts the query to each of its neighbor peers. While individual hosts are generally unreliable with respect to availability at any given moment, the resources themselves, i.e., the content being sought, tend to be highly available because resources are generally replicated and widely distributed in proportion to demand in peer-to-peer networks. Generally, however, resources are identified only by file name and file names are subject to the individual preferences of each host node for its local directory structure. Thus, one specific problem is how to search intelligently and efficiently for relevant resources in a peer-to-peer network.

Again, it is common to store content data files at each peer's local directory structure simply by the given file name. For example, web sites such as Napster™/$^{SM}$ simply store data by a file name associated with the artist or specific song title to facilitate searching. Simple descriptor queries thus get a very large number of unsorted returns. In fact, even a web site search engine in a non-peer-to-peer system, such as the commercial Google, AltaVista, and the like engines, provides a list of all return links potentially relevant to a query—namely, each and every file found which has a match, or "hit,"

to the query—which the user must then study for relevance to the actual interest intended, then visit serially those which actually may be authoritative. That is, all of these web search engines rely upon human intelligence to build and keep the information they contain—in the form of links to web pages—relevant and current.

Another method of data storage at a given node is by random names in order to hide actual file identity. This raises the problem of need for some form of mapping between the random names and the actual files.

Another method for data retrieval is collaborative filtering where patterns of searches by like-minded searchers are analyzed and leveraged to produce allegedly more relevant results to a specific query. Such analysis inherently requires the documents to be public and known to the searchers in advance for providing an answer message to the query.

As another method for limiting query distribution, the query message itself (see e.g., FIG. 3 (Prior Art, message header 300) can include a decrementing, time-to-live ("TTL") field whereby the number of node propagations is limited. For example, if the TTL is set to seven, each neighbor node passing on the message thereby identifies itself as the first, second, third, et seq., node receiving the message, decrementing the TTL. If the current neighbor node is the seventh node in a peer-to-peer network link chain, it will not forward the message because TTL has reached zero.

In general, existing solutions focus on locating every specific instance of each of the resources that is a potential match to the query. Thus, a replicated resource is likely to appear multiple times in multiple responses to one specific query.

BRIEF SUMMARY

In its basic aspect, embodiments of the present invention provide mechanisms for distributed information retrieval in peer-to-peer networks. A key to improving the speed and efficiency of information retrieval processes is to minimize the communication costs, that is, the number of messages sent between peers and number of peers that are queried for each search request. To achieve this, each peer autonomously calculates for each query which of its peers are more likely to have an appropriate answer and propagates the query message only to those peers or a subset thereof.

The foregoing summary is not intended to be an inclusive list of all the aspects, objects, advantages and features of theses embodiments nor should any limitation on the scope of the invention be implied therefrom. This Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches. Other objects, features and advantages will become apparent upon consideration of the following explanation and the accompanying drawings, in which like reference designations represent like features throughout the drawings.

DETAILED DESCRIPTION

Figure 1:
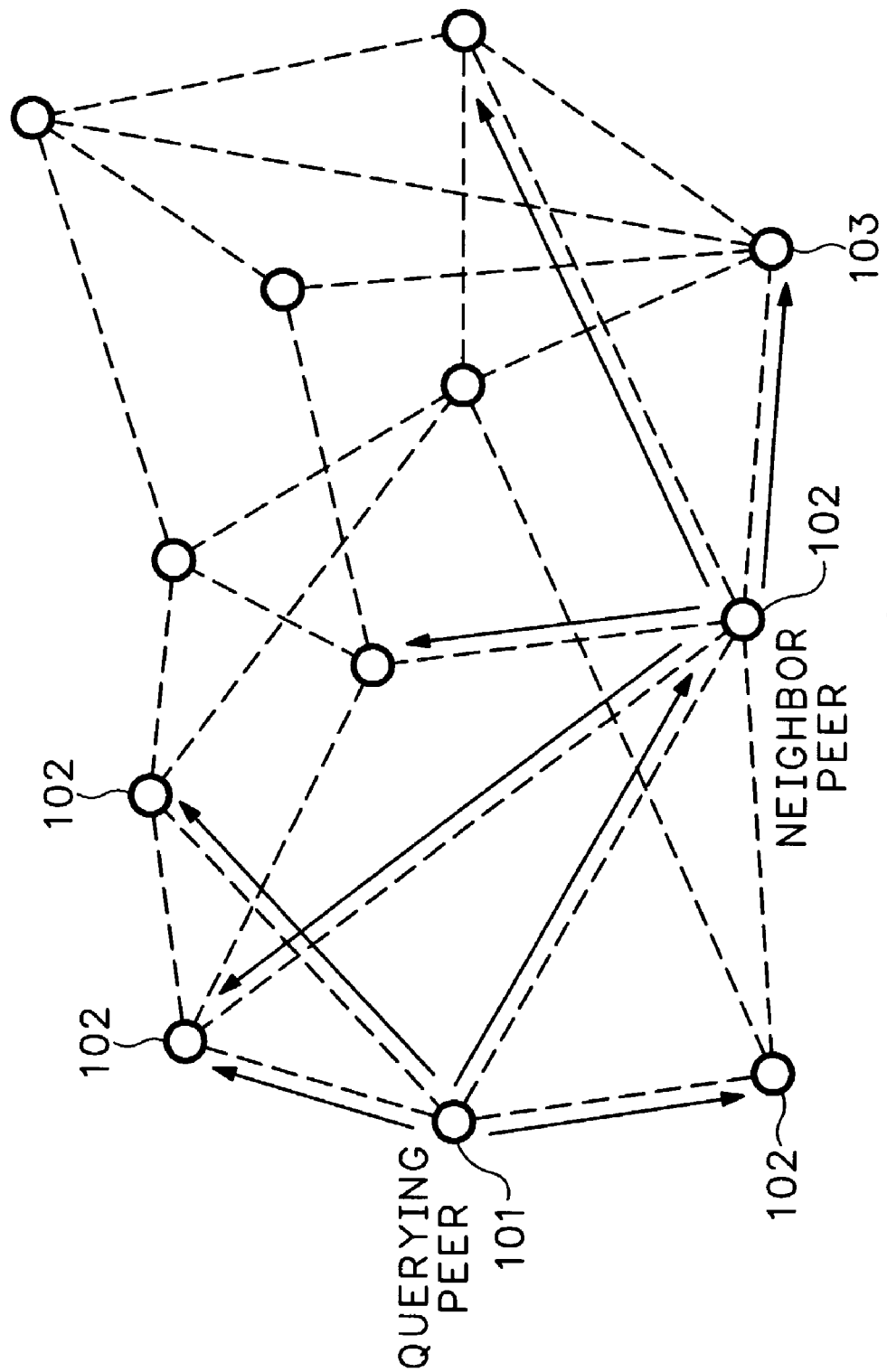
FIG. 1 (Prior Art) is a schematic diagram of searching in a Gnutella peer-to-peer network.

As demonstrated by FIG. 1 (Prior Art), peer-to-peer searching is often "unintelligent;" i.e., a query message is simply broadcast to all neighbor peers 102 and then propagates from there. None of the prior art information retrieval methods provide any ranking of peer-to-peer nodal-based resources. In other words, there is no measure of relevance as to how relevant any particular peer is as to the current topic-of-interest, e.g., what is each peer's knowledge with respect to the topic of "jazz music?"

Figures 2, 3:
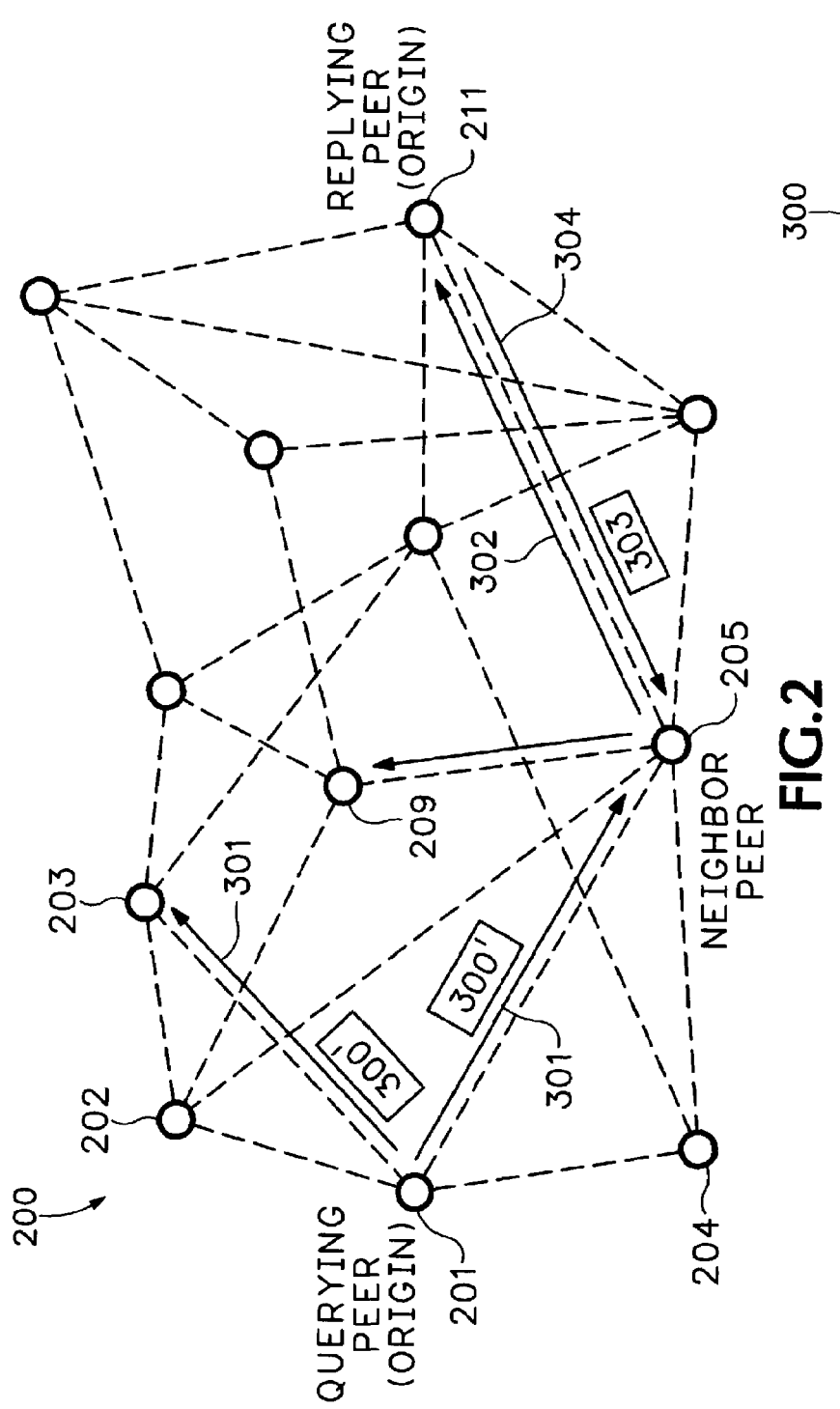
FIG. 2 is a schematic diagram of intelligent searching in a peer-to-peer network system in accordance with embodiments of the present invention.
FIG. 3 is an exemplary peer-to-peer message header for messages exchange in the network system as shown in FIG. 2.
Figure 4:
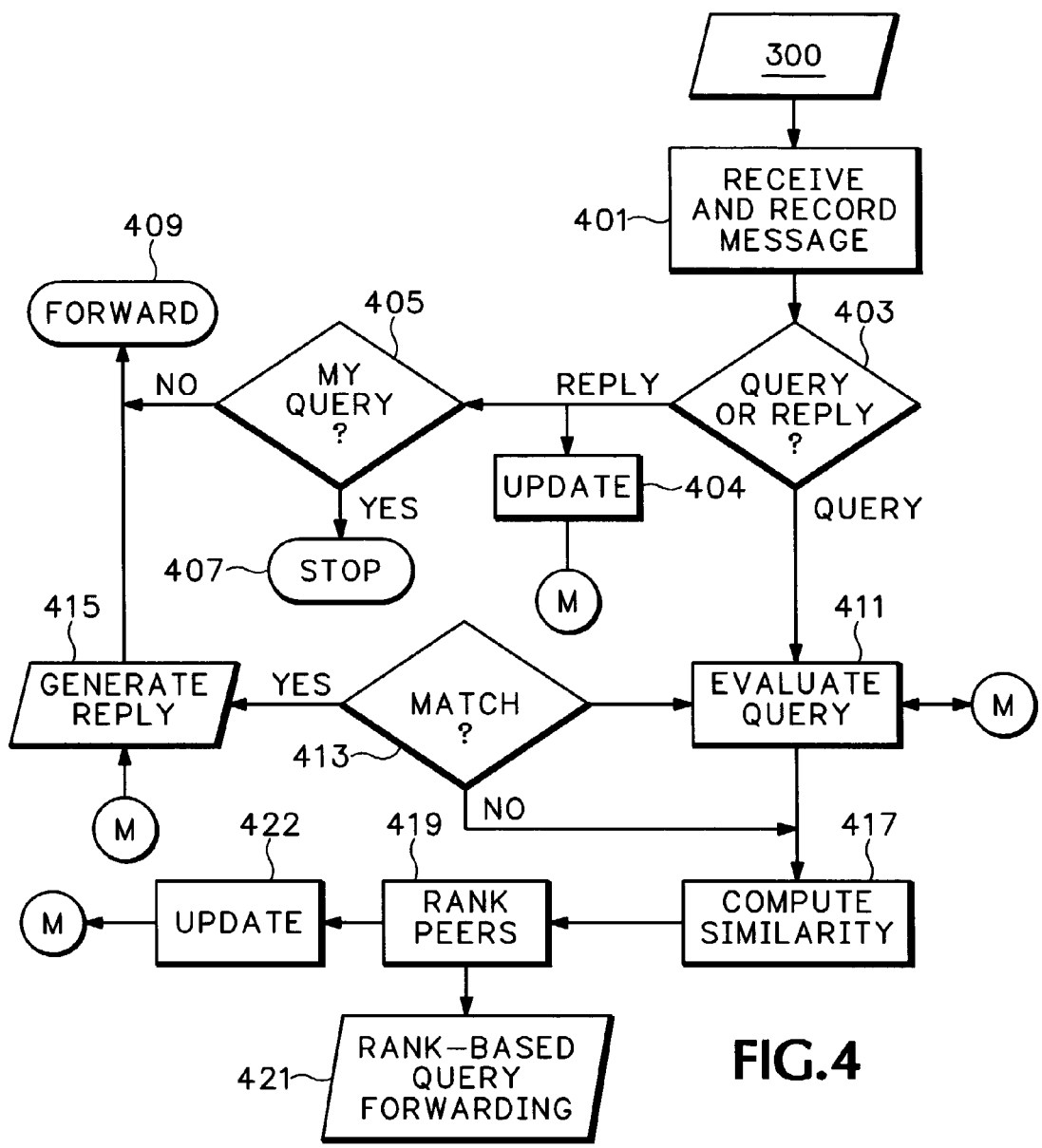
FIG. 4 is a flow chart illustrating an embodiment of a process associated with the embodiment of FIG. 2.

FIG. 2 is a schematic of a peer-to-peer network 200 and FIG. 4 is a flow chart demonstrating a process 400 for intelligent searching in such a peer-to-peer network. In general, each peer uses the knowledge it obtains from monitoring past queries and replies to propagate a new query message only to a subset of its peers. Simultaneous reference to both FIGS. 2 and 4 will aid in understanding the following details.

The Querying Peer 201 originates a data packet message 300', including a header 300 as exemplified by FIG. 3, using Gnutella or the like protocol and data messaging format. A common protocol provides semantic consistency for the peer-to-peer system 200. Such data packet messages 300' are known in the art and a further detailed description here is not necessary for full understanding of the present invention; these data pack messages are referred to as simply a "Query" or "Reply" message which can be recognized from the protocol descriptors fields. Let the arrows labeled 301 in FIG. 2 represent the original Query broadcast from a peer 201 to Neighbor Peers 203, 205.

In general, the process begins when any peer node(s) to whom any message is directed receives and records such a data packet message 300', step 401, in accordance with programming associated with such a protocol. Each node sends messages only to a subset of its direct-link peers; if a node receives the same message more than once from different peers, it discards all the duplicate messages and replies only to the first message received.

Next 403, is for each receiving node, e.g., 202, 203, to determine from a currently received message data packet whether the current message is a Query or Reply. If the current message data packet is a Reply, step 403, REPLY-path, the receiving node 202, 203, determines, step 405, whether the Reply was a response to a Query it generated itself. If so, step 405, YES-path—in other words the receiving node is actually the node Querying Peer 201—the Reply message is processed appropriately, step 407, as it relates to the Query; following the previously used example, opening a received document file having an article regarding "jazz music." If the receiving node is not the origination Querying Peer 201 node—the Reply message is forwarded to the node from which it received the Query message, step 409. Note that this node to which the Reply message is sent can be the origination Querying Peer 201 or could be a Neighbor Peer in a chain of network links back toward the Querying Peer. For example, if node 211 has received a Query, represented by arrow 302, from node 205, for which it has an appropriate Reply message, it becomes an origination "Replying Peer." It formulates a Reply message data packet 303, step 415, and sends it back, represented by arrow 304, to the node from whom it received the Query 302, namely Neighbor Peer 205. Note that for peer ranking (described hereinafter), the receiving node also updates its data base, step 404, relating the peer address providing the Reply message to the topic of the original Query for its own future reference.

Now assume the currently received data packet message is a Query, step 403, QUERY-path. The receiving node in accordance with its programming related to such a message data packet evaluates the Query 300, step 411; in general, comparing it to its own databases for a related logical reply information meeting the constraints of the protocol, e.g., looking for a match, step 413, between the message search criteria and keywords stored locally for such a purpose; e.g., a local document file on "jazz music." Local memory can thus be organized, for example, into a "query historical database," a "reply historical database," and a "local information, or files, database," where local memory is being represented in FIG. 4 by the circled-letter "M".

If a successful match is found, step 413, YES-path, the receiving node generates, step 415, a Reply message in accordance with the constraints of the Query. The Reply message is returned, step 409, to the appropriate Neighbor or originating Querying Peer 201, at least identifying the local information available from the now "Replying Peer" 211 and optionally even automatically shipping that information.

In parallel, each peer will compute a relational characteristic, e.g., a similarity factor, step 417, associating the current Query with previously seen queries in its local database. A specific similarity factor implementation will be described below, but variety of known manner or proprietary probability and statistics programs for computing the similarity may be adapted for that purpose.

Since the receiving node, e.g., Neighboring Peer 205, did not have a match, its next step 419 is to rank its peers with respect to the current Query 300. In other words, based on the receiving nodes stored, M, experience data, it can rank the probability of any other node with which it has had prior experience with respect to the Query's search criteria. That is, from its databases, each peer will accumulate knowledge related to the topics of previous queries and replies; e.g., peer node 205 may know that peer node 211 previously had information regarding the topic "jazz music" and therefore if node 205 receives a new query having the keyword "jazz," peer node 211 may be given a highest rank as a good target for receiving the current query; if node 209 previously provided no reply to a previous query having the constraint "jazz," it would not likely be a target node for receiving the current query including the same constraint. As an option, a node may choose to forward a particular query to an additional peer even though it has a low relevance probability so that there is an avoidance of always sending queries to the same peers.

As an option, after a learning time period and based on its developed knowledge of previous query-reply data, a node may calculate that another node to which there is no current link, such as between node 205 and node 203, has a relatively high probability of having data meeting the constraints of the current message search criteria. In the latter case, an option is an attempt to establish an open link with such a currently off-line peer.

Based on the ranking, the current Query is forwarded, step 421, only to those peers with a ranking indicative of a predetermined relatively high probability of having data related to the Query.

The experience of computing similarity 417 and ranking peers 419 with respect to a current specific Query is stored 422 appropriately for future computations, namely, upon receipt of another query.

Note that each reply received by the Querying Peer 201 is a message that is also analyzed with respect to similarity and peer ranking for use in generating future intelligent searches, namely initial query broadcasting. Referring to FIG. 2, as shown the Querying Peer 201 only broadcasts its current Query intelligently—represented by arrows labeled 301—namely only to nodes 203, 205, but not node 202 nor node 204 because the Querying Peer 201 previously learned that such a broadcast to would not be likely to have any appropriate Reply. In other words, based on its previous experience of queries and replies, it can form a ranking of its peers with respect to specific new message descriptors.

When a node has a current Query for which it has no relevant answer data and no past knowledge of other peers ranked for the current topic, as a default, it simply broadcasts the query to all its neighboring peers. When a plurality of reply messages with the same data but from different peers are received by the Querying Peer 201, a default to the best current connectivity path is established and the duplicate(s) discarded; e.g., receiving the data from node 203 rather than node 211 via node 205.

Figure 5:
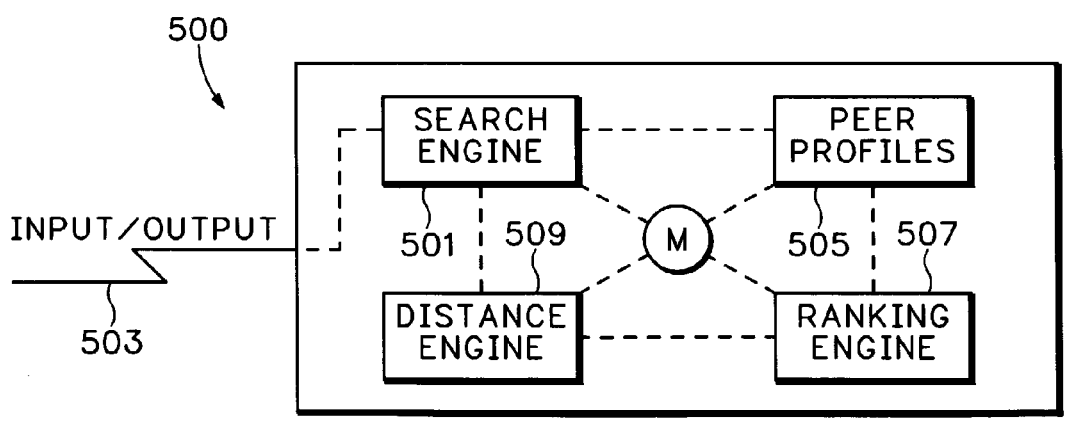
FIG. 5 is a system block diagram for a tool associated with the embodiments of FIGS. 2 and 4.

A system 500 for distributed information retrieval is exemplified by FIG. 5. A graphical user interface ("GUI," not shown) can be provided in a known manner for operating the system. The system may be stored upon a computer readable medium (e.g., memory). A search engine, or routine, 501 is provided for sending queries; a proprietary or commercial (e.g., Gnutella) protocol mechanism may be employed as long as there is consistency or compatibility among all peers.

Assume that a peer node initiates a search to find documents about a specific topic. Since the originating peer is initiating the search, it is the Querying Peer 201, FIG. 2. The Querying Peer 201 generates a Query message 300' that describes his request using the search engine 501. Before broadcasting via the input/output 503, the Querying Peer 201 finds which of his peers are most likely to provide an appropriate answer using a peer profiler 505 and peer ranking engine 507. The Querying Peer 201 broadcasts the Query message 300 to those peers only who are probabilistically most likely to have the appropriate answer.

If a neighbor peer receives a Query message 300', it can also be labeled a "Receiver Peer;" for example in FIG. 2, nodes 203, 205, 209 and 211. If the Receiver Peer can provide an answer, it returns the document to the requesting Querying Peer 201 using the same path that the Query message follows. Otherwise, it propagates the Query message 300' only to those of his peers it considers most likely to provide the answer. To provide a termination condition so that the messages are not propagated indefinitely in the network, the Querying Peer 201 sets a bound on the depth of the recursion. When a Reply message is sent back toward the Querying Peer 201, the peers in the answer path (which is the same as the query path) record the query and the name of the peer that provided the answer in a "query,peer" table. Each peer may set a boundary on the number of pairs to be recorded, and uses a least recently used strategy to allow space for new queries.

To decide which nearest peers a query will be sent to, a peer ranks all its peers with respect to the given query using a ranking engine 507. Note also that different peers are ranked differently for different queries. The number of peers that a query will be sent is a parameter that is defined by the user. To rank its peers, each node maintains a profile for each of its peers. The profile should contain a list of the most recent past queries that the specific peer that provided the answer for. Although logically a node may consider each profile to be a distinct list of queries, another implementation may for example also use a single "Queries" table with "Query, Node" entries that keeps the most recent queries the peer has recorded. Each node can accumulate the list of past queries by two, or more, different mechanisms. In the first mechanism, the peer is continuously monitoring and recording each Query message and any corresponding "QueryHit," viz., a match, messages it receives. In the second, each peer, when replying to a Query message, broadcasts this information to its neighbor peers. This operation increases the accuracy of the system, at the expense of "0(d)" extra messages, where "d" is the average degree of connectivity of each peer in the network. Each node keeps the list of queries in its local repository. For each node this list is incomplete, because each node can only record information about those queries that were routed through it. The node uses a size limit "T" that limits the number of queries in each profile. Once the repository is full, the node may use a Least Recently Used ("LRU") policy to keep the most recent queries in the repository. Since the node keeps profiles for its neighbors only, the total size of the repository is "0(Td)."

For each query it receives, the Receiver Peer uses the profiles of its peers to find which ones are more likely to have documents that are relevant to the query. To compute the ranking, the Receiver Peer compares the query to previously seen queries and finds the most similar ones in the repository. To find the similarity between the queries, it uses the distance function provided by a distance engine, routine 509 (described below). In one implementation, it is reasonable to employ a "Nearest Neighbor" classification technique in that it is simple and provides good accuracy in many different settings. It has been found that the Nearest Neighbor classification has asymptotic error rate at most twice the Naive Bayes error rate, independent of the distance metric used. Since it is likely that some peers will be associated with many similar queries, and others with some, an aggregate similarity of a peer to a given query is computed. Given the "K" most similar queries to current query "q," the aggregate similarity of peer "P_i" to query "q" that peer "P_k" computes is:

$$\text{Psim\_P\_k}(P\_i, q) = \sum_{q\_i \text{ was answered by } P\_i} Qsim(q\_j, q)^{\wedge}\alpha. \quad \text{(Equation 1)}$$

In this sum, "q_j" is one of the "K" most similar queries to "q." This parameter limits the influence to the similarity to the most similar queries only. In addition, the parameter alpha allows adding more weight to the most similar queries. For example, when alpha is very large, "Psim" reduces to one-nearest neighbor. For "alpha=0," "Psim" reduces to "K"-nearest neighbor. If "alpha=1", "Psim" adds up the similarities of all queries that have been answered by the peer. The Receiver Peer then sends the query to the "m" peers for a user defined constant "m<d," that have the higher rank.

In one implementation, the distance engine 509 uses a distance function based on a cosine similarity. In order to find the most likely peers to answer a given query, a similarity is computed (note that it is known in the art that a similarity function can easily be converted to provide a distance function) between different queries. Since the queries are sets of keywords, we can use a number of different techniques that have been used effectively in information retrieval. An assumption that a peer that has a document that is relevant to a given query is likely to have documents that are relevant to similar queries. This is a reasonable assumption if each peer concentrates on a set of topics. Assume that the query space is "Q", then the similarity of queries "q_1,q_2∈Q" can be given by a function:

$$Qsim: Q^2 \rightarrow (0,1) \quad \text{(Equation 2)}.$$

The distance is then:

$$1 - Qsim(q\_1, q\_2) \quad \text{(Equation 3)}.$$

Let "L" be a set of all words that have appeared in queries. Then, define an |L|-dimensional space where each query is a vector. For example, if the set "L" is the words "{A,B,C,D}" and we have a query "A,B", then the vector that corresponds to this query is (1,1,0,0). Similarly, the vector that corresponds to query "B,C" is (0,1,1,0). In the cosine similarity model, the similarity of the two queries is simply the cosine of the angle between the two vectors. It can be computed using the cosine law and is the dot product of the two vectors over the product of the lengths of the two vectors—in this example case, it is ½.

It is also possible to combine a distance function, such as the exemplary cosine similarity test described, with other information retrieval techniques to refine or enhance any specific implementation. For example, the cosine similarity metric can give small similarity to queries that use different words that have similar meaning. Latent Semantic Indexing ("LSI") is a known manner information retrieval technique that has been used to group words to similar contexts. The technique works by finding a different basis to describe the same document space described by the original set of words.

Thus, the system and process described provides an automatic, self-learning, infrastructure with automatic scalability for presenting current, high quality content replies to peer-to-peer queries while minimizing the number of messages forwarded. The system and process can be adapted to a variety of uses, including research projects, the conducting of business transactions, and the like; no limitation on the scope is intended nor should any be implied from the generic description provided herein.

The foregoing description, illustrating certain embodiments and implementations, is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand for various embodiments and with various modifications as are suited to the particular use or implementation contemplated. The scope of the invention can be determined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . " and no process step herein is to be construed under those provisions unless the step or steps are expressly recited using the phrase "comprising the step(s) of . . . ."

What is claimed is:

1. A method for conducting information retrieval in a distributed network of nodes, the method comprising:
   receiving, by a computing device, a current message;
   differentiating, by the computing device, the current message between a query message and a reply message, and if the current message is a reply message, associating, by the computing device, said reply message with a node address originating said reply message and storing data representative of said associating, said data including the node address originating the reply message and a topic of a query that resulted in the reply message;

when said current message is a query, determining, by the computing device, a similarity factor from data representative of the current message to data representative of the prior received queries and ranking each known node with respect to the current message based on said similarity factor;

forwarding, by the computing device, said current message to only nodes of the distributed network having a predetermined statistical probability of having a reply relevant to said query based on the similarity factor; and receiving, by the computing device, a reply from at least one of the nodes of the distributed network having a predetermined statistical probability of having a reply relevant to said query based on the similarity factor.

2. The method as set forth in claim 1 comprising:
storing, by the computing device, data representative of said ranking.

3. The method as set forth in claim 1 wherein said forwarding is related to a predetermined number of nodes based on said ranking.

4. The method as set forth in claim 1 comprising:
at a receiving node, when said current message is a query from a node originating or forwarding the query, determining, by the computing device, if there is information representative of said reply capability available at the receiving node and if so, transmitting data representative of said information to the node originating or forwarding said query.

5. The method as set forth in claim 1 wherein said similarity factor is a calculated distance function between different queries.

6. The method as set forth in claim 3 said forwarding further comprising:
if an addressable node has a ranking greater than a predetermined threshold, determining, by the computing device, if there is a current open link to said addressable node, and
if so, forwarding, by the computing device, said current message, or
if not, attempting, by the computing device, to establish an open link to said addressable node for forwarding said current message, and if said open link can not be established, sending a message indicative of said ranking greater than a predetermined threshold to a node originating or forwarding the query.

7. The method as set forth in claim 1 wherein said reply relevant to said query is a set of data having content with a predetermined statistical probability of matching current query message packet search criteria.

8. A computer readable medium containing a information retrieval tool for a peer-to-peer network, each peer's information retrieval tool comprising:
input-output means for input and output of messages;
coupled to said input-output means, search engine means for generating messages representative of informational queries and informational replies related to queries received;
associated with the search engine means, 1) peer-profiler means for maintaining data representative of known peers query-reply history, 2) similarity means for determining a similarity of a current query to previous said queries received, the determining using the data representative of known peers query-reply history, and 3) associated with said peer profiler means and said similarity means, ranking means for ranking known peers with respect to the determined similarity of the current query; and
a storage means for storing the similarity determined by the similarity means and the ranking of known peers with respect to the determined similarity of the current query.

9. The computer readable medium containing the tool as set forth in claim 8 wherein said search engine means forwards said queries received only to one or more peers having a ranking greater than a predetermined threshold.

10. The computer readable medium containing the tool as set forth in claim 9 wherein said search engine means forwards said queries to a predetermined number or less of said peers.

11. The computer readable medium containing the tool as set forth in claim 8 further comprising:
discriminating means for discriminating between query messages and reply messages.

12. The computer readable medium containing the tool as set forth in claim 11 comprising:
said discriminating means further including means for associating a reply message with a peer address and storing data representative of said associating with said peer-profiler means.

13. The computer readable medium containing the tool as set forth in claim 8 wherein said tool is implemented in a computer program.

14. A distributed network information retrieval system comprising:
a network of autonomous peers, each having variable network connectivity, a temporary network address, and an informational database;
a common networking protocol used by each of said peers;
each peer according to said peer's proprietary system being able individually to analyze query messages received and to forward query messages only to a set of peers based on a derived peer ranking associated with likelihood of any particular peer having said informational database related to said informational retrieval query messages; and
each peer being able to receive a reply from one of the set of peers to which the query messages are forwarded.

15. The system as set forth in claim 14 wherein said common networking protocol includes means for extracting information from each one of said query messages, including at least search constraint and peer address from said query messages.

16. The system as set forth in claim 14 wherein said proprietary system includes means for recomposing said query messages and redistributing said query messages.

17. A computer-readable storage medium comprising software that, when executed by a processor, causes the processor to:
receive network messages associated with information retrieval;
differentiate the network messages between a query message and a reply message, and
when a current message is a reply message, associate said reply message with a node address originating said reply message and storing data representative of said associating, said data including the node address originating the reply message and a topic of a query that resulted in the reply message;
relate a current query message data to previously stored query message data by determining a similarity factor from data representative of the current message to data representative of the prior received queries;

determine other nodes of the network having a predetermined statistical probability of having information related to the current query message from knowledge of previous reply messages issued by said other nodes with respect to said previously stored query message data and the similarity factor; and determine existence of local node information related to the current query message and for transmitting a reply message indicative of said determining to said query message.

18. The computer-readable storage medium of claim 17 wherein the software causes the processor to:

build a data set representative of history of all query and reply messages passing through the node.

19. The computer-readable storage medium of claim 17 wherein the software causes the processor to:

build a data set representative of history of similarity of the current query message to all prior query messages passing through the node.

20. The computer-readable storage medium of claim 17 comprising a computer memory.

21. A system comprising:

a processor; and a program memory storing software that, when executed by the processor, causes the processor to:

receive network messages associated with information retrieval;

relate a current query message data to previously stored query message data by determining a similarity factor from data representative of the current message to data representative of the prior received queries; and determine other nodes of the network likely to have information related to the current query message based on knowledge of previous reply messages issued by said other nodes with respect to said previously stored query message data and the similarity factor;

forward query messages only to a set of peers based on a derived peer node ranking associated with likelihood of any particular node having said informational database related to said query message; and receive a reply message from at least one of the set of peers to which the query messages are forwarded.

* * * * *